United States Patent
Chapman et al.

(10) Patent No.: US 6,354,410 B1
(45) Date of Patent: Mar. 12, 2002

(54) RUBBER BONDED ANCHOR PIN

(75) Inventors: Keith J. Chapman, Chester; Richard Martin Bellingham, Wrexham, both of (GB)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/488,514

(22) Filed: Jan. 20, 2000

(51) Int. Cl.[7] .............................................. F16D 69/00
(52) U.S. Cl. ................. 188/250 F; 188/328; 188/79.63
(58) Field of Search ................................. 188/327, 328, 188/334, 341, 79.63, 250 F

(56) References Cited

U.S. PATENT DOCUMENTS

| | | | | |
|---|---|---|---|---|
| 1,665,690 A | * | 4/1928 | Dodge ........................ 188/341 |
| 1,675,291 A | * | 6/1928 | Bendix ........................ 188/341 |
| 1,681,014 A | * | 8/1928 | Sanford ....................... 188/341 |
| 2,102,851 A | * | 12/1937 | La Brie ..................... 188/250 F |
| 3,136,390 A | * | 6/1964 | Zukowski .................... 188/341 |
| 3,677,376 A | * | 7/1972 | Barajas ....................... 188/341 |
| 4,053,034 A | * | 10/1977 | Katzer ..................... 188/206 R |
| 4,157,747 A | * | 6/1979 | Getz et al. .................. 188/341 |
| 4,353,442 A | * | 10/1982 | Correa ........................ 188/330 |
| 4,648,491 A | * | 3/1987 | Taylor ........................ 188/341 |
| 4,679,667 A | * | 7/1987 | Zawodni ..................... 188/341 |
| 4,766,980 A | * | 8/1988 | Engle ........................... 188/52 |
| 5,094,323 A | * | 3/1992 | Mitchell .................. 188/73.31 |
| 5,255,763 A | * | 10/1993 | Redgrave et al. ........... 188/330 |

* cited by examiner

Primary Examiner—Matthew C. Graham
Assistant Examiner—Devon Kramer
(74) Attorney, Agent, or Firm—Carlson, Gaskey & Olds

(57) ABSTRACT

A brake assembly of a vehicle for enduring corrosive road effects is disclosed. The brake assembly includes a mounting bracket having a bore. An anchor pin extends through the bore of the mounting bracket to rotatably support a brake shoe of the assembly. More specifically, the anchor pin includes first and second end portions and an outer surface, and the brake shoe rotates about the first and second end portions of the anchor pin relative to the mounting bracket. A rubber layer is disposed between the outer surface of the anchor pin and the bore of the mounting bracket to permit rotation of the brake shoe about the mounting bracket in the event the brake shoe becomes corrosively bonded to the pin. In such an event, a flexural stiffness of the rubber layer enables rotation of the anchor pin relative to the mounting bracket, and since the brake shoe is bonded to the anchor pin, the brake shoe also rotates relative to the mounting bracket thereby maintaining operation of the brake assembly.

9 Claims, 1 Drawing Sheet

RUBBER BONDED ANCHOR PIN

BACKGROUND OF THE INVENTION

The subject invention relates to a rubber bonded anchor pin of a brake assembly for a vehicle, particularly a heavy vehicle such as a truck or tractor-trailer.

One type of known vehicle brake assembly incorporates a brake drum, mounting brackets including conventional anchor pins, brake shoes rotatably supported by the anchor pins for rotation of the brake shoes relative to the mounting brackets, an air chamber, and return springs.

When an operator of a vehicle activates the brake assembly, air is introduced into the air chamber which forces the brake shoes, from an initial position, into contact with the brake drum to slow or completely stop the vehicle. When the operator of the vehicle deactivates the brake assembly, the return springs draw the brake shoes back to their initial position. When moving to contact the brake drum, and in returning to the initial position, the brake shoes rotate about the anchor pins relative to the mounting bracket.

The conventional anchor pins encompass two general designs. One known anchor pin is a solid metal design. A second known anchor pin is a two-piece roller design. In the solid metal design, the anchor pin is fixed relative to the mounting bracket, and under normal conditions, the brake shoe rotates about the anchor pin. In the two-piece roller design, the anchor pin rotates relative to the mounting bracket within a sleeve that is pressed into the mounting bracket, and under normal conditions, the brake shoe and anchor pin rotate relative to the mounting bracket. Both designs are susceptible to corrosion problems resulting from rust, road debris, heat, mechanical wear, and other road effects realized throughout the normal duty of the vehicle. For instance, in the solid metal design, the anchor pin can corrosively bond to the mounting bracket primarily due to heat and rust. The anchor pin in the two-piece roller design is similarly susceptible to corrosive bonding due to heat and rust. Furthermore, in either design, the brake shoe can corrosively bond directly to the anchor pin. If the brake shoe bonds to the anchor pin, and the anchor pin is corrosively bonded to the mounting bracket, then the brake shoe cannot rotate about the anchor pin.

Due to the inefficiencies identified in conventional brake assemblies that incorporate conventional anchor pins, it is desirable to implement a brake assembly that endures corrosive road effects by disposing a rubber layer between the anchor pin and the mounting bracket to permit rotation of the brake shoe about the mounting bracket in the event the brake shoe becomes corrosively bonded to the anchor pin.

SUMMARY OF THE INVENTION AND ADVANTAGES

A vehicle brake assembly for enduring corrosive road effects is disclosed. The brake assembly includes a mounting bracket including a bore. An anchor pin extends through the bore of the mounting bracket. The anchor pin includes first and second end portions and an outer surface. The brake assembly includes a brake shoe rotatably supported on the anchor pin for rotation relative to the mounting bracket. A rubber layer is disposed between the outer surface of the anchor pin and the bore of the mounting bracket.

The rubber layer, and the incorporated flexural stiffness of the rubber layer, permits rotation of the brake shoe about the mounting bracket in the event the brake shoe becomes corrosively bonded to the pin. Additionally, the rubber layer eliminates all metal-to-metal contact between the outer surface of the anchor pin and the bore of the mounting bracket thereby preventing the outer surface of the anchor pin from corrosively bonding to the bore.

Accordingly, the subject invention provides a brake assembly for a vehicle that endures corrosive road effects by disposing a rubber layer between the anchor pin and the mounting bracket. Consequently, the anchor pin does not bond to the bore, and in the event the brake shoe does become corrosively bonded to the anchor pin, rotation of the brake shoe about the mounting bracket is still permitted and proper operation of the brake assembly is maintained.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
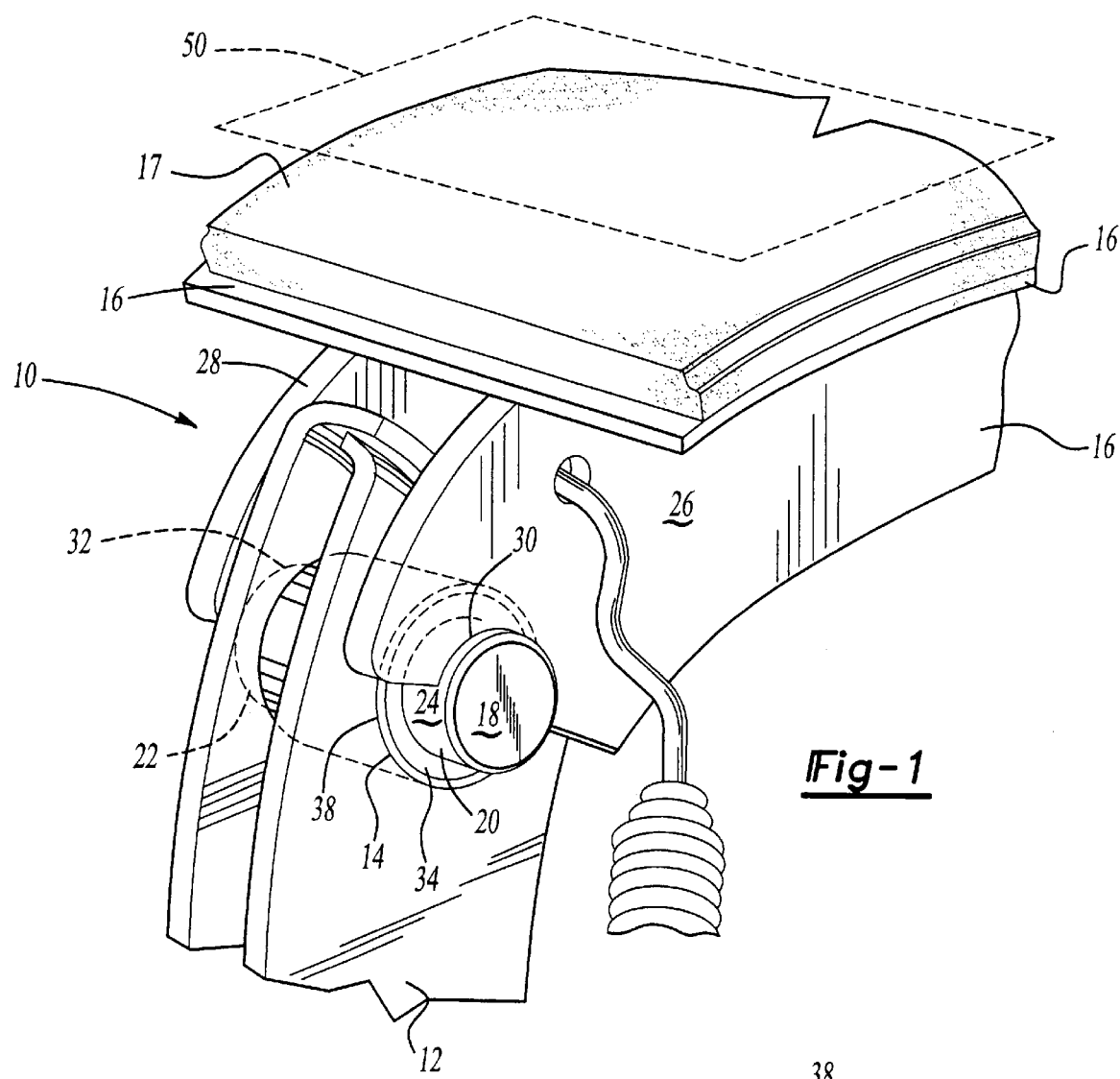
FIG. 1 is an overall perspective view of a brake assembly for a vehicle illustrating a brake shoe rotatably supported by an anchor pin of the assembly for rotation of the brake shoe relative to a mounting bracket.

Referring to the Figures, wherein like numerals indicate like or corresponding parts throughout the several views, a brake assembly of a vehicle for enduring corrosive road effects is generally shown at 10. FIG. 1 details a mounting bracket 12 including a bore 14, a brake shoe 16, and an anchor pin 18 of the subject invention. The bore 14 of the mounting bracket 12 includes an inner surface, not numbered in the Figures. The anchor pin 18 includes first 20 and second 22 end portions and an outer surface 24, and extends through the bore 14 of the mounting bracket 12. The inner surface of the bore 14, and the anchor pin 18, including the first 20 and second 22 end portions and the outer surface 24, will be described further hereinbelow.

Although not shown in the Figures, it should be understood that the mounting bracket 12 includes a second bore. A second anchor pin is disposed in the second bore of the mounting bracket 12, and a second brake shoe operates to compliment the function of the brake shoe 16 and anchor pin 18 disclosed in FIG. 1. However, for descriptive purposes, the subject invention will be described below only in terms of the brake shoe 16, and anchor pin 18 disclosed in FIG. 1.

The brake shoe 16 is rotatably supported by the anchor pin 18 for rotation relative to the mounting bracket 12. The brake shoe 16 rotates on the anchor pin 18. As such, when an operator of the vehicle activates the brake assembly 10, the brake shoe 16, including a brake pad 17, rotates from an initial position about the anchor pin 18 relative to the mounting bracket 12. The brake pad 17 contacts a brake drum 50, shown schematically, to slow or completely stop the vehicle. The brake shoe 16 includes a first flange 26 and a second flange 28. The first flange 26 of the brake shoe 16 is rotatably supported by the first end portion 20 of the anchor pin 18 for rotation of the brake shoe 16 relative to the mounting bracket 12. Similarly, the second flange 28 of the brake shoe 16 is rotatably supported by the second end portion 22 of the anchor pin 18 for rotation of the brake shoe 16 relative to the mounting bracket 12. As shown in FIG. 1, the mounting bracket 12 is disposed between the first 26 and second 28 flanges, and the anchor pin 18, which extends through the bore 14 of the mounting bracket 12, also extends between the first 26 and second 28 flanges where the first 20 and second 22 end portions of the anchor pin 18 are engaged by the first 26 and second 28 flanges. More specifically, the first 26 and second 28 flanges include first 30 and second 32 receiving channels, respectively. The first receiving channel 30 is rotatably supported by the first end portion 20 of the anchor pin 18, and the second receiving channel 32 is rotatably supported by the second end portion 22 of the anchor pin 18.

Figure 2:
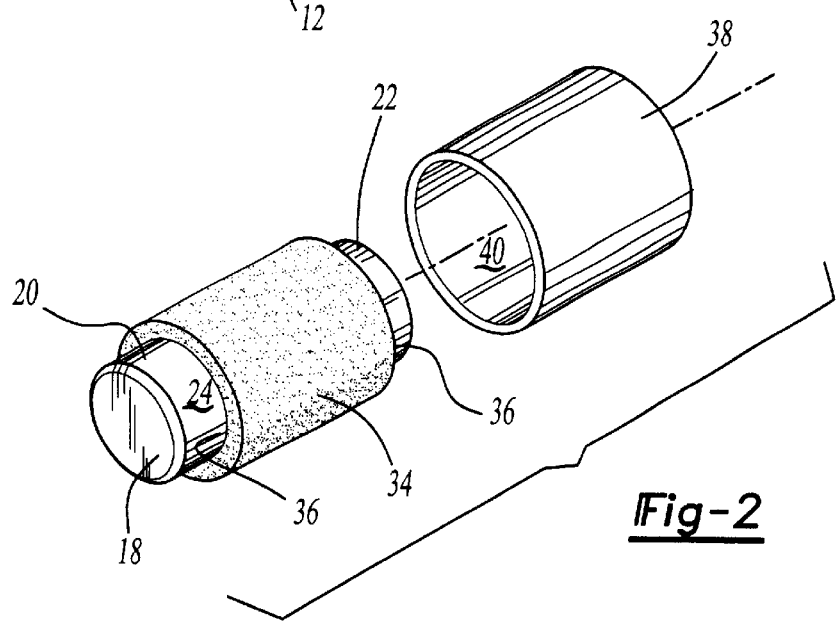
FIG. 2 is an exploded perspective view illustrating a rubber layer disposed about a central segment of the anchor pin and a bushing of the brake assembly.

Referring now to FIGS. 1 and 2, a rubber layer 34 is disposed between the outer surface 24 of the anchor pin 18 and the bore 14 of the mounting bracket 12 to permit rotation of the brake shoe 16 about the mounting bracket 12 in the event the brake shoe 16 becomes corrosively bonded to the pin 18. Preferably the rubber layer 34 is Viton™ which is available from DuPont in pellet form. As such, the rubber layer 34 is preferably a fluoropolymer rubber layer and is resistant to thermal degradation. However, without varying the scope of the subject invention, the rubber layer 34 may be natural rubber, or a polymer other than a fluoropolymer, that is resistant to thermal degradation. Further, the rubber layer 34 incorporates a flexural stiffness. As appreciated, the flexural stiffness of the rubber layer 34 is determined by a Shore hardness of the rubber layer 34 and a thickness of the rubber layer 34. In the preferred embodiment of the subject invention, the Shore hardness of the rubber layer 34 is 75 and the thickness of the rubber layer 34 is approximately two to three millimeters.

As referenced in the Background section, due to road effects experienced throughout the normal duty of the vehicle, such as heat and rust, the brake shoe 16 can corrosively bond to the anchor pin 18. If the brake shoe 16 becomes corrosively bonded to the pin 18, the flexural stiffness of the rubber layer 34 disposed between the outer surface 24 of the anchor pin 18 and the bore 14 of the mounting bracket 12 enables rotation of the anchor pin 18 relative to the mounting bracket 12. Preferably, the flexural stiffness of the rubber layer 34 enables rotation of the anchor pin 18 by at least ±3°. As appreciated, since in this event the brake shoe 16 has bonded to the anchor pin 18, when the brake shoe 16 also rotates relative to the mounting bracket 12, the anchor pin 18 also rotates. The rubber layer 34 allows the pin to rotate relative to the bracket. Brake assembly 10 may fail if the anchor pin 18 corrosively bonds to the bore 14. The rubber layer 34 of the subject invention negates any potential for the outer surface 24 of the anchor pin 18 to corrosively bond to the bore 14 by eliminating all metal-to-metal contact between the outer surface 24 of the anchor pin 18 and the bore 14 of the mounting bracket 12.

The anchor pin 18 includes a central segment 36 between the first 20 and second 22 end portions with the rubber layer 34 disposed about the central segment 36. Specifically, the rubber layer 34 is mechanically bonded to the outer surface 24 of the pin 18 through the application of heat and pressure. Alternatively, an adhesive can be applied between the outer surface 24 of the pin 18 and the rubber layer 34 to bond the rubber layer 34 to the pin 18. As appreciated, after the rubber layer 34 is mechanically bonded to the outer surface 24 of the pin 18, an outer circumference of the rubber layer 34 is machined for mating with the bore 14. Further, the end portions 20, 22 project outwardly from the central segment 36 beyond the rubber layer 34. As a result, the rubber layer 34 is not disposed about the first 20 and second 22 end portions as the rubber layer 34 is disposed about the central segment 36 of the anchor pin 18. In an alternative embodiment of the subject invention, the rubber layer 34 can be disposed about the inner surface of the bore 14 whereby the end portions 20, 22 of the pin 18 project outwardly from the bore 14 beyond the rubber layer 34 to permit rotation of the brake shoe 16 about the mounting bracket 12 in the event the brake shoe 16 becomes corrosively bonded to the pin 18.

Continuing, the brake assembly 10 preferably incorporates a bushing 38 with an inner surface 40 that is disposed in the bore 14 of the mounting bracket 12. Therefore, in the preferred embodiment of the subject invention, in addition to extending through the bore 14 of the mounting bracket 12, the anchor pin 18 similarly extends through the bushing 38. The central segment 36 of the anchor pin 18 is disposed in the bushing 38, and the first 20 and second 22 end portions project outwardly from the bushing 38. Similar to the potential failure of the brake assembly 10 introduced above, the brake assembly 10 may also fail if, when the bushing 38 is incorporated, the anchor pin 18 corrosively bonds to the bushing 38. However, when the bushing 38 is incorporated into the subject invention, the rubber layer 34 is disposed between the central segment 36 of the anchor pin 18 and the bushing 38. Therefore, the anchor pin 18 is prevented from bonding to the bushing 38, and failure of the brake assembly 10 is avoided.

Alternatively, the rubber layer 34 can be disposed about the inner surface 40 of the bushing 38 whereby the end portions 20, 22 of the pin 18 project outwardly from the bushing 38 beyond the rubber layer 34 to permit rotation of the brake shoe 16 about the mounting bracket 12 in the event the brake shoe 16 becomes corrosively bonded to the pin 18. Of course, if the bushing 38 is incorporated as in the preferred embodiment, then the outer circumference of the rubber layer 34 is machined for mating with the bushing 38.

During typical operation of the brake assembly 10, the brake shoe 16 is not corrosively bonded to the anchor pin 18, and the brake shoe 16 rotates relative to the anchor pin 18. That is, as long as the brake shoe 16 is not corrosively bonded to the anchor pin 18, the rubber layer 34 frictionally holds the anchor pin 18 against rotation relative to the mounting bracket 12, and the brake shoe 16 rotates relative to the anchor pin 18. However, if the brake shoe 16 is corrosively bonded to the anchor pin 18, then the brake shoe 16 can only rotate with the anchor pin 18. In such a case, the rubber layer 34 maintains the ability to flex thereby permitting the anchor pin 18 and also the bonded brake shoe 16 to rotate relative to the mounting bracket 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specificallydescribed.

What is claimed is:

1. A vehicle brake assembly comprising:

a mounting bracket including a bore;

an anchor pin having first and second end portions and an outer surface, said anchor pin extending through said bore of said mounting bracket, wherein said anchor pin includes a central segment between said first and second end portions with said rubber layer disposed about said central segment, and wherein said end portions project outwardly from said central segment beyond said rubber layer;

a brake shoe rotatably supported by said anchor pin for rotation of said brake shoe relative to said mounting bracket, wherein said brake shoe includes a first flange rotatably supported by said first end portion of said anchor pin for rotation of said brake shoe relative to said mounting bracket, and a second flange rotatably supported by said second end portion of said anchor pin for rotation of said brake shoe relative to said mounting bracket; and a rubber layer disposed between said outer surface of said anchor pin and said bore of said mounting bracket.

2. An assembly as set forth in claim 1 further including a bushing disposed in said bore of said mounting bracket.

3. An assembly as set forth in claim 2 wherein said anchor pin extends through said bushing.

4. An assembly as set forth in claim 3 wherein said central segment of said anchor pin is disposed in said bushing, and said first and second end portions project outwardly from said bushing.

5. An assembly as set forth in claim 4 wherein said rubber layer is disposed between said central segment of said anchor pin and said bushing to prevent said anchor pin from bonding to said bushing.

6. An assembly as set forth in claim 2 wherein said bushing includes an inner surface.

7. An assembly as set forth in claim 6 wherein said rubber layer is disposed about said inner surface of said bushing whereby said end portions of said pin project outwardly from said bushing beyond said rubber layer to permit rotation of said brake shoe about said mounting bracket in the event said brake shoe becomes corrosively bonded to said pin.

8. A vehicle brake assembly comprising:

a mounting bracket including a bore having an inner surface;

an anchor pin having first and second end portions and an outer surface, said anchor pin extending through said bore of said mounting bracket;

a brake shoe rotatably supported by said anchor pin for rotation of said brake shoe relative to said mounting bracket; and a rubber layer disposed between said outer surface of said anchor pin and said bore of said mounting bracket, wherein said rubber layer is disposed about said inner surface of said bore whereby said end portions of said pin project outwardly from said bore beyond said rubber layer to permit rotation of said brake shoe about said mounting bracket in the event said brake shoe becomes corrosively bonded to said pin.

9. A vehicle brake assembly comprising:

a mounting bracket including a bore;

an anchor pin having a central segment, first and second end portions, and an outer surface, said anchor pin extending through said bore of said mounting bracket;

a brake shoe having a first flange and a second flange, said first flange rotatably supported by said first end portion of said anchor pin for rotation of said brake shoe relative to said mounting bracket, and said second flange rotatably supported by said second end portion of said anchor pin for rotation of said brake shoe relative to said mounting bracket; and a rubber layer disposed about said central segment of said anchor pin between said outer surface of said anchor pin and said bore of said mounting bracket wherein said first and second end portions project outwardly from said central segment beyond said rubber layer to support said brake shoe.

\* \* \* \* \*